Figure 11:
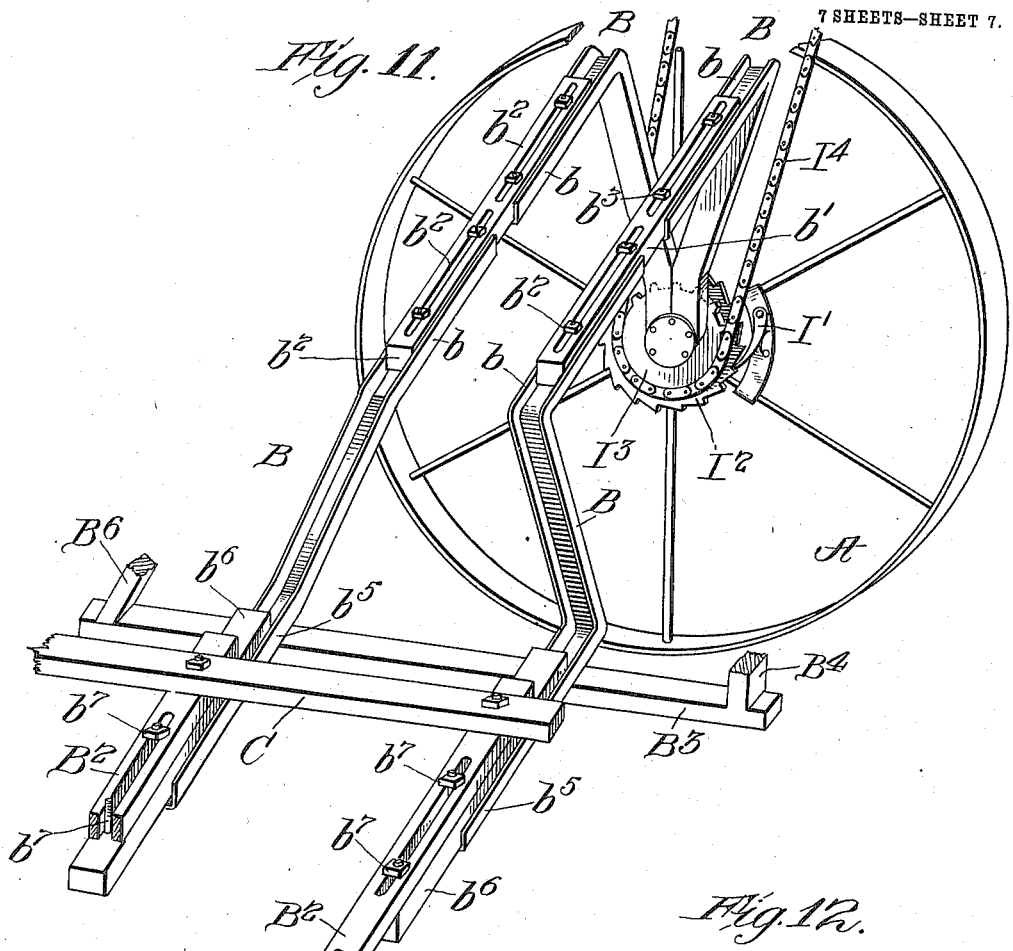

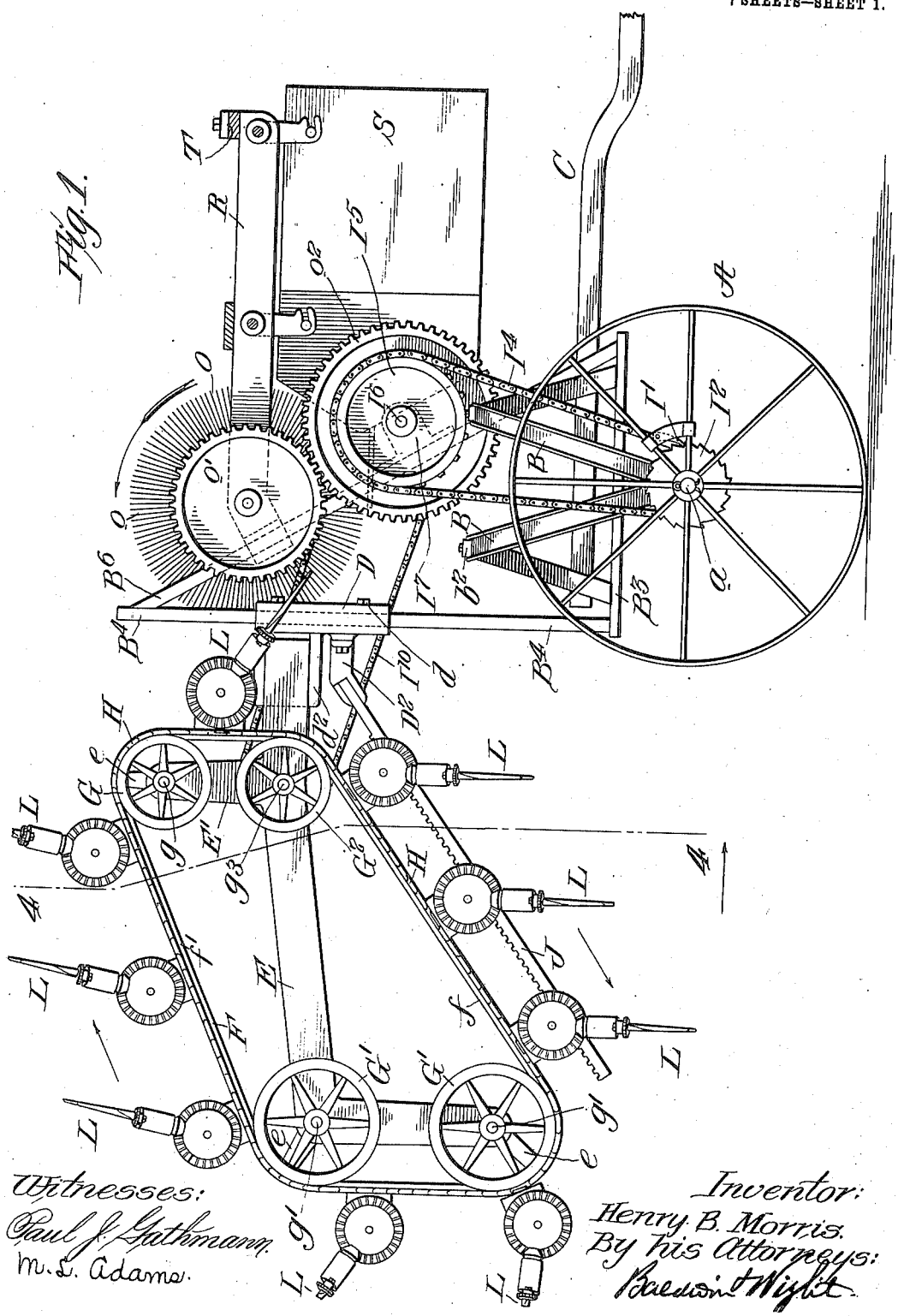

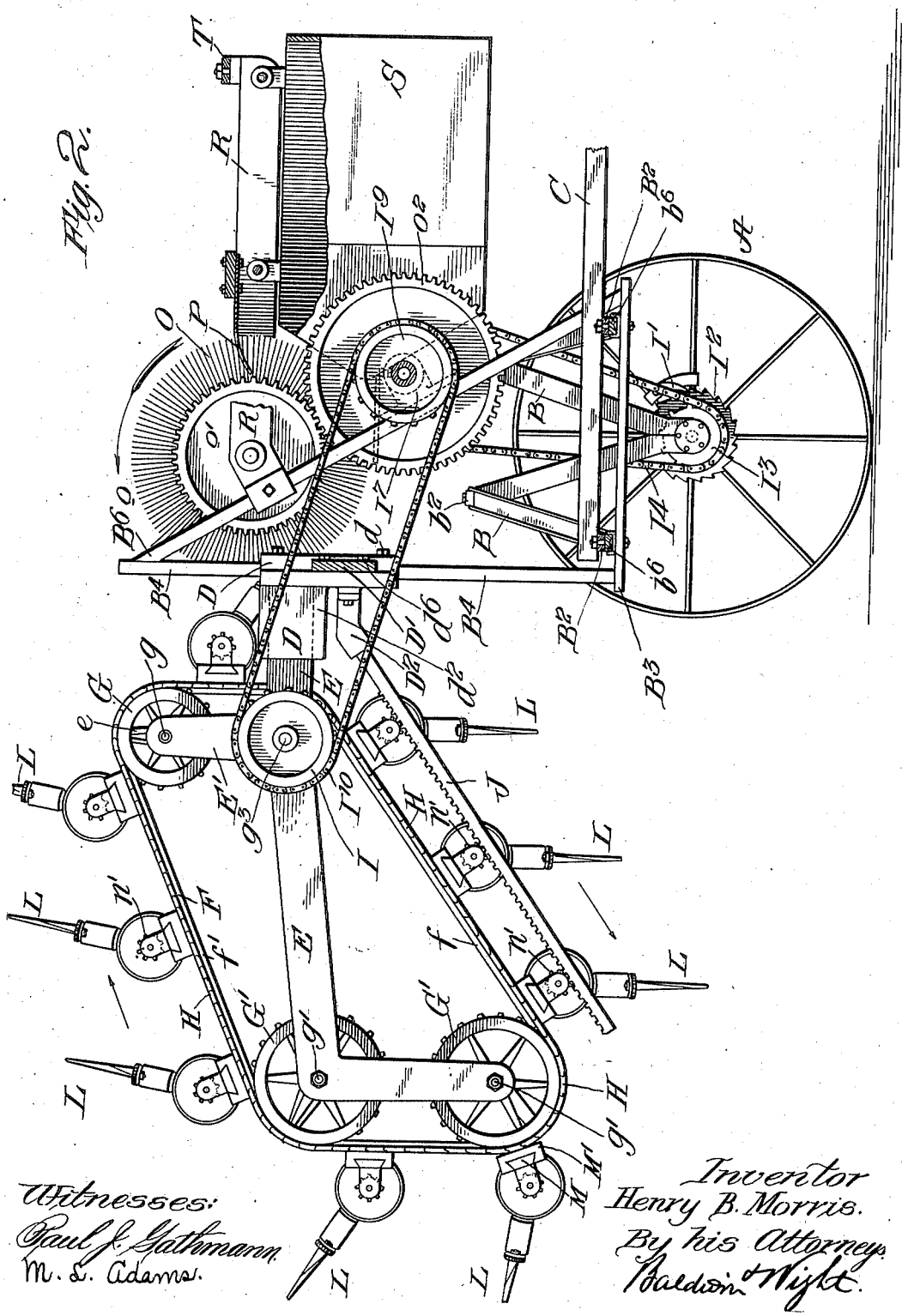

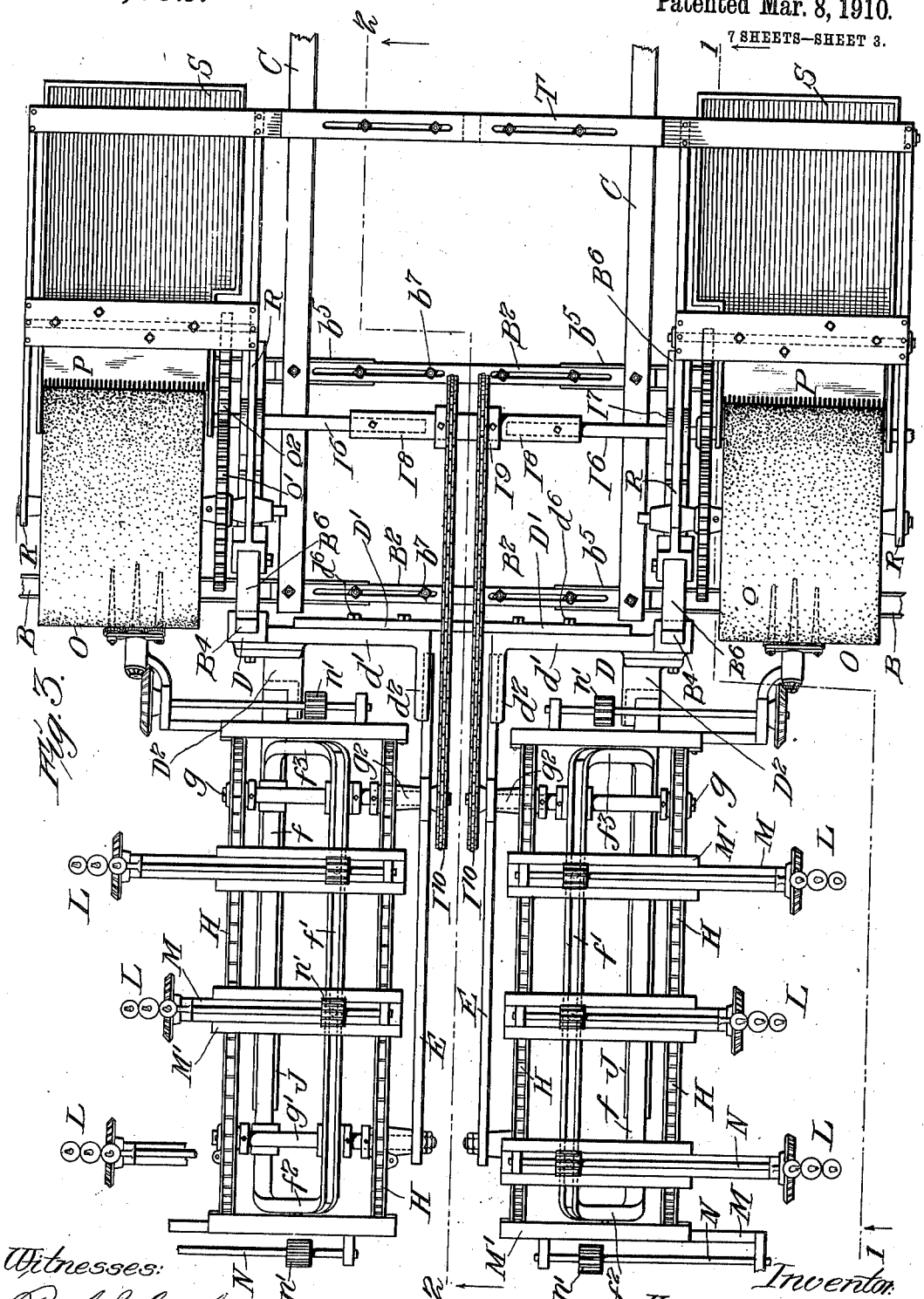

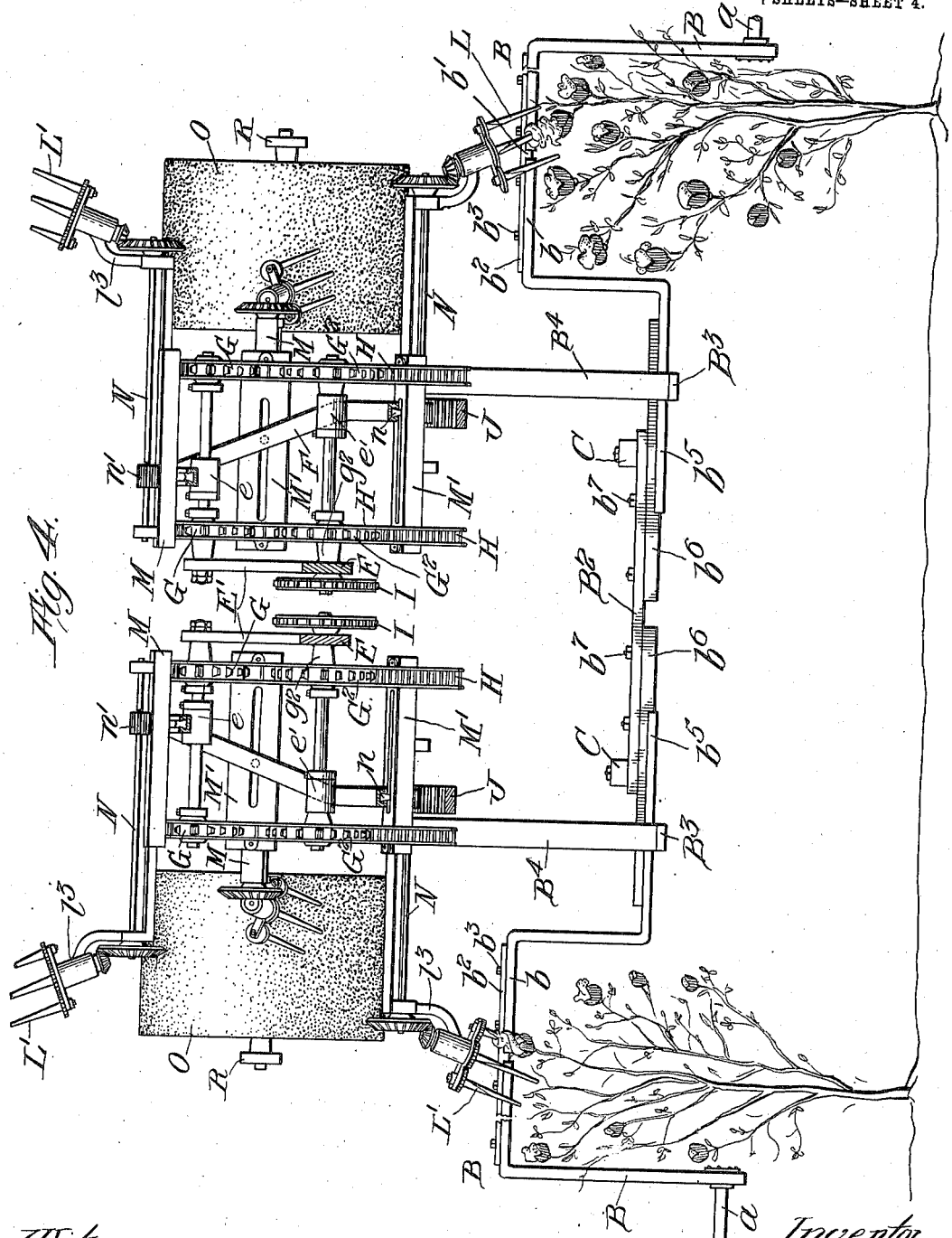

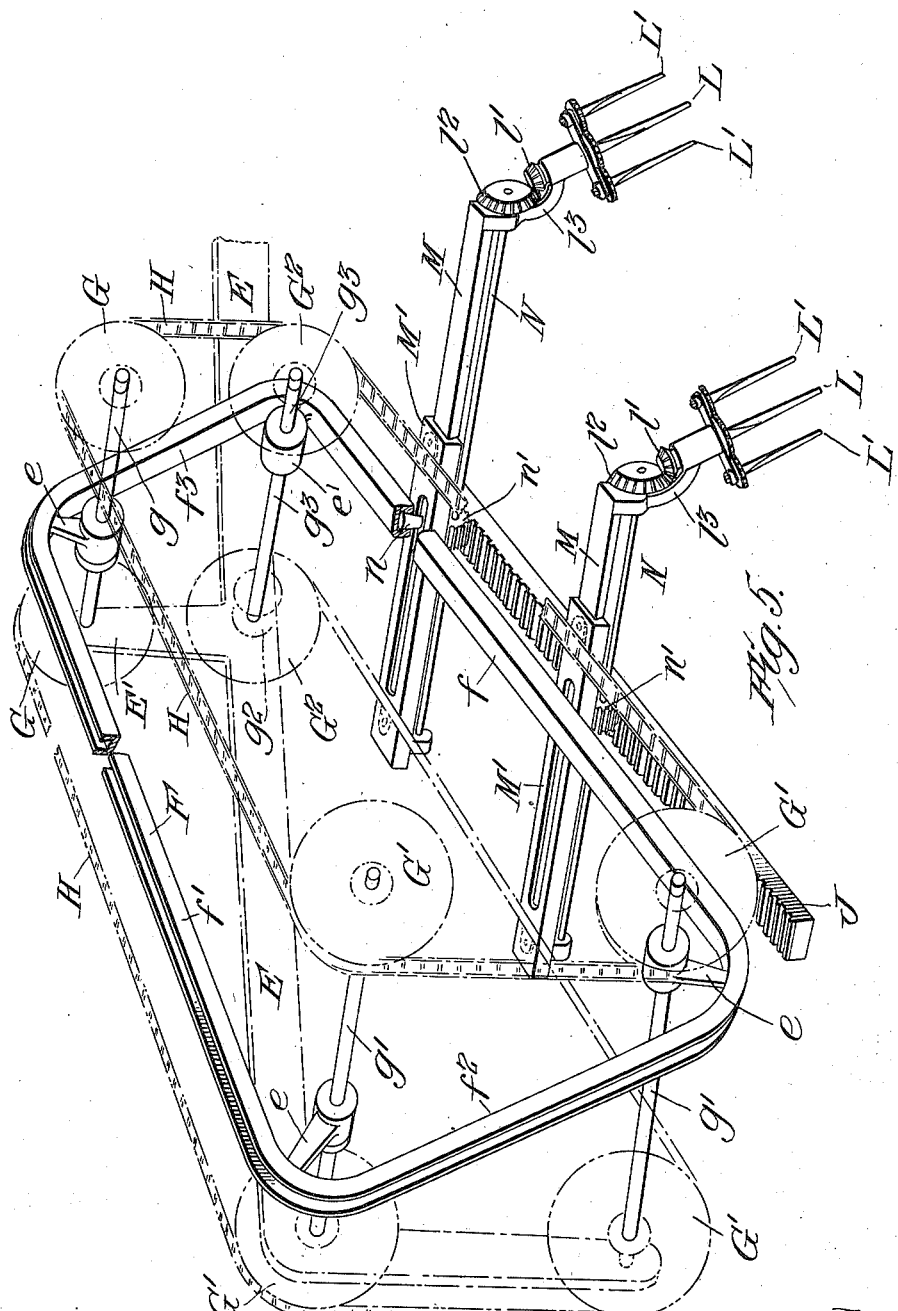

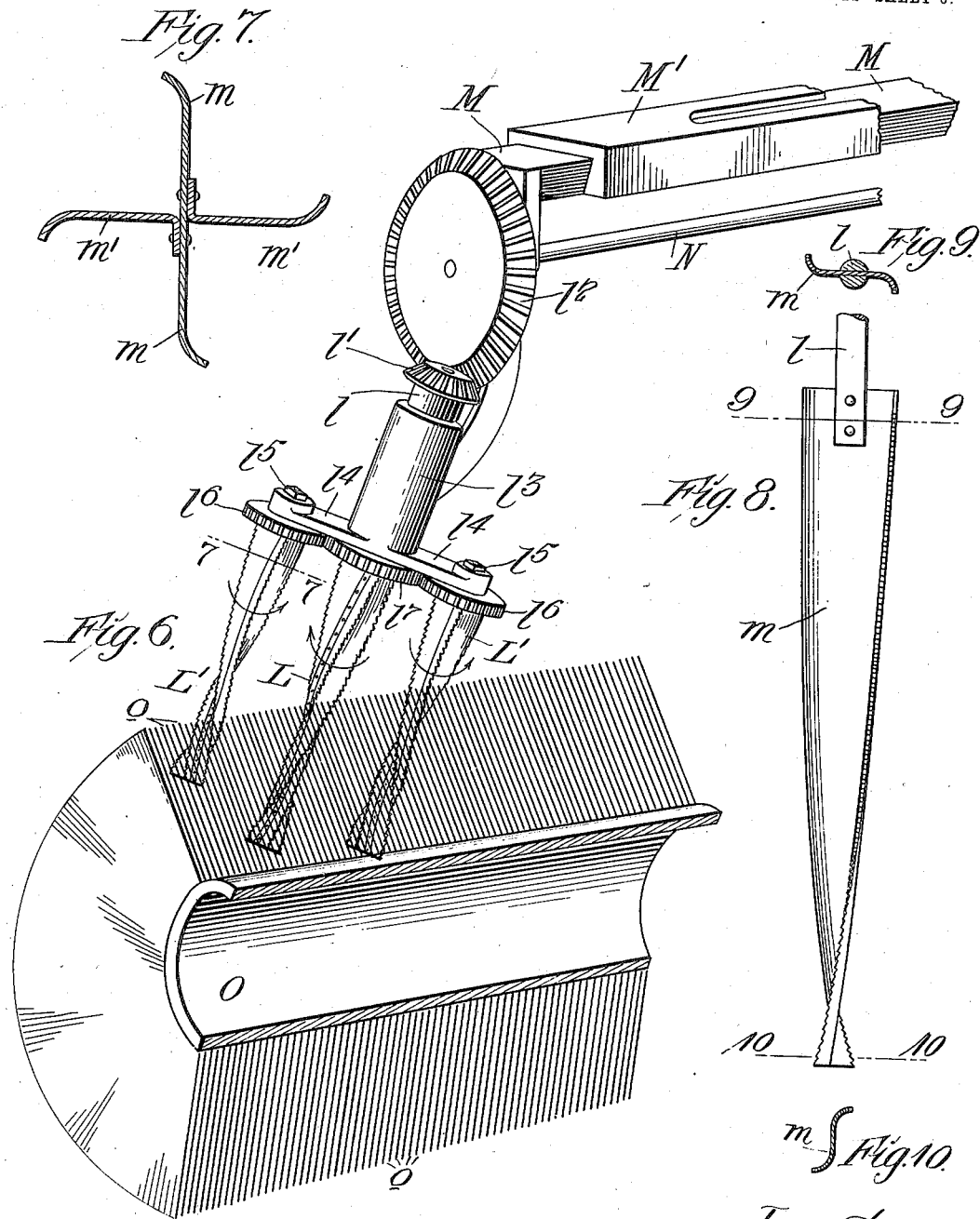

H. B. MORRIS.
COTTON HARVESTING MACHINE.
APPLICATION FILED JULY 13, 1908.

951,652.

Patented Mar. 8, 1910.
7 SHEETS—SHEET 7.

Witnesses:
Paul J. Gathmann
M. L. Adams

Inventor
Henry B. Morris
By his Attorneys
Baldwin Wight

UNITED STATES PATENT OFFICE.

HENRY B. MORRIS, OF GRAND RAPIDS, MICHIGAN, ASSIGNOR OF ONE-HALF TO HENRY W. JOHNSON, OF CHICAGO, ILLINOIS.

COTTON-HARVESTING MACHINE.

951,652.  Specification of Letters Patent.  Patented Mar. 8, 1910.

Application filed July 13, 1908. Serial No. 443,328.

*To all whom it may concern:*

Be it known that I, HENRY B. MORRIS, a citizen of the United States, residing in Grand Rapids, in the county of Kent and State of Michigan, have invented certain new and useful Improvements in Cotton-Harvesting Machines, of which the following is a specification.

My invention relates to cotton harvesting machines of the class in which cotton is gathered from the ripe bolls on the standing plants, as the machine is drawn across the field, by means of what are known in this art as "picker-stems" or toothed spindles which, as the machine progresses, are thrust into the plants while being revolved each about its own axis, enter the bolls, take hold of the ripe cotton, detach it from the bolls and carry the gathered cotton to strippers which clear the picker-stems and deposit the cotton in suitable receptacles. Machines of this class have heretofore been usually arranged to straddle a row of plants and to thrust the picker-stems into the bushes from opposite sides thereof or vertically downward thereinto. The machine constructed in accordance with my invention is adapted to operate between two adjacent rows and to pick cotton from one-half of each plant in each of such rows, no attempt being made to pick all the cotton at one operation from the entire plant, the opposite side of the plant being picked in the next trip through the field. As the distance between the rows of plants differs materially in different places, and according to different modes of planting, and different conditions of soil I employ means whereby the width of the machine may be varied to accommodate such variations in the widths of the spaces between the rows, and as the lower bolls ripen first and are ready to be picked before the others, I so construct the mechanism that the picker-stems may be made to operate on either the upper or lower portions of the plants, means being provided for adjusting the picker mechanism vertically for this purpose.

My machine comprises two carrying wheels on which is supported an arched front or main frame provided with devices by means of which its width may be adjusted. To the front part of the front or main frame the draft devices are secured and to the rear part thereof are attached the frames supporting the picker mechanism. These latter frames are made vertically adjustable so that the picking mechanism may be elevated or depressed bodily to hold the picker-stems a movement rearward at such on either the upper or lower parts of the plants. The picker-stems are arranged in groups and they are provided with pinions at times gearing with racks which cause them to rotate as they are moved from one end to the other of the picker-frames and they are caused by cam tracks to descend into the plants and also to rise vertically out of them while revolving each about its own axis. The picker-stems are carried by endless chains which give them the movements above specified to move them into and out of the plants, and these chains also give the picker-stems a movement rearward at such speed as to cause the picker-stems to remain practically stationary so far as any advancing movement with the machine is concerned while in the plants so that there may be no dragging action on the stems, leaves, etc. of the plants which would tend to injure them, the arrangement being such that the picker-stems are thrust vertically into the plants, revolved therein, and then moved vertically outward from the plants, first boring into the bolls and gathering the cotton therefrom, and then rising out of the plants without injury thereto. Mechanism is provided whereby the groups of pickers are moved laterally toward and away from the plane of the plants, the pickers being carried into the range of mechanism which strips the cotton from the picker-stems and deposits it in suitable receptacles.

Figure 12:
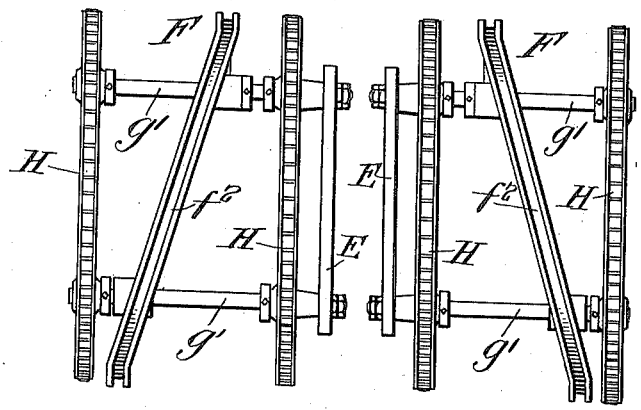

In the accompanying drawings,—Figure 1 is a view partly in side elevation and partly in section on the line 1—1 of Fig. 3. Fig. 2 shows a vertical central section of the machine on the line 2—2 of Fig. 3. Fig. 3 is a plan view of the machine, some of the parts being partially broken away in order to better illustrate other parts. Fig. 4 shows a transverse section on the line 4—4 of Fig. 1. Fig. 5 is a perspective view showing diagrammatically the most essential parts of the picker-stems and the mechanism for operating them. Fig. 6 illustrates the manner of separating the cotton from the picker-stems. Fig. 7 shows a cross section of one of the picker-stems on the line 7—7 of Fig. 6. Fig. 8 shows an elevation of one form of picker-stem which may be employed. Fig. 9 shows a cross section thereof on the line 9—9 of Fig. 8; and Fig. 10 shows a cross section on the line 10—10 of Fig. 8. Fig. 11 is a perspective view showing certain details of the main frame of the machine whereby it may be widened or narrowed. Fig. 12 shows a rear elevation of a part of the machine illustrating particularly the arrangement of the cam tracks for controlling the movements of the pickers.

The cotton harvesting machine shown in the drawings is so constructed that the draft animal walks between two adjacent rows of cotton plants while the carrying-wheels travel in the two adjacent "balks" on opposite sides of such rows. The picker mechanism is carried by the machine between the two adjacent rows, and the main frame is arched on opposite sides in such manner that while supporting the carrying-wheels on opposite sides of the rows of plants operated upon, the plants are cleared or bridged by the frame as the machine advances. As the widths of the spaces between the rows vary considerably in various places and as the widths of the cotton plants also vary, the main frame is made adjustable as to width so as to accommodate the varying widths of the plants and the varying widths of the spaces between the rows of plants, the adjustment being such that the carrying-wheels may travel in the middle portions of the balks on opposite sides of the rows being operated upon, while the arched portions of the frame bridge the rows of plants without coming in contact with them whatever be their widths.

The mechanism is mounted in two carrying-wheels A of large diameter, say six feet, to afford good driving power and all the mechanism is operated from said wheels as the machine advances. The wheels are loosely mounted on stud axles $a$ projecting from the front or main frame of the machine and are geared to the picker-mechanism in the manner hereinafter described. The main or front frame comprises on each side two arched bars B, preferably made of channel iron, their lower, outer, converging ends being firmly connected together in any suitable way and carrying the stud axles $a$. From the axles $a$ the bars extend upwardly in a vertical plane and diverge from each other until they reach a horizontal plane somewhat above the tops of the wheels whence they extend in lines parallel to each other toward the middle portion of the machine and are then bent abruptly downward and extended diagonally in diverging directions until they reach a plane somewhat above the axial line of the wheels when they are extended in parallel lines toward the middle of the machine. This construction provides for supporting the carrying-wheels on opposite sides of two rows of plants, bridging the plants themselves and supporting the working parts of the mechanism between the rows of plants.

In order to vary the widths of the arched bars, the upper horizontal portions $b$ thereof are divided at $b'$ and are connected by means of slotted bars $b^2$ through the slotted portions of which extend bolts $b^3$ attached to the parts $b$ of the arched bars. It will readily be understood how the widths of the arches may be adjusted by the devices shown. The inner portions $b^5$ of the frame bars have firmly secured to them short bar sections $b^6$ which are connected to slotted bars $B^2$ by means of bolts $b^7$. In this way the arched bars on opposite sides of the machine may be moved bodily toward and from each other and inasmuch as there are duplicate sets of picking mechanisms on opposite sides of the machine, as will be hereinafter more fully explained, and as it is necessary that the picking mechanism should be adjusted to correspond with variations in the widths of the spaces between the rows of plants, the adjusting devices shown are of importance. I have shown simple but efficient means for varying the widths of the arches and for widening and narrowing the main frame, but obviously these adjustments may be made in other ways and by other devices than those illustrated.

To the portions $b^5$ of the bars B are attached bars $B^3$ running longitudinally in lines parallel with the line of draft and from the rear ends of these bars rise vertical bars $B^4$ from the upper ends of which extend downwardly diagonally arranged bars $B^6$ which are attached at their lower ends to the front ends of the bars $B^3$. In this way a vertical triangular frame is constructed on each side of the machine and these frames may be adjusted toward and from each other by adjusting the connections between the frames B in the manner hereinbefore described.

The shafts C for the draft animal may be attached to the main frame in any suitable way, as shown they are attached to the slotted cross bar $B^2$. Each vertical bar $B^4$ carries a casting D which is vertically adjustable on the bar $B^4$, being held thereon by set screws $d$, and these castings are preferably connected by a horizontal bar $D'$ which is adjustably connected by means of bolts $d^6$ with the castings D, so that when the main or front frame is widened or narrowed suitable adjustments may be made to provide for the lateral movements of the castings D which, of course, move sidewise with the triangular frames above referred to. Each casting D is formed with a laterally projecting portion $d'$ extending toward the middle portion of the machine, its inner end being formed with a rearwardly extending portion $d^2$ to which is secured in any suitable way an L-shaped frame E. These frames E support a large part of the picker-mechanism and should be sufficiently strong for that purpose while being as light as possible. It is therefore convenient to make such frame comparatively thin but sufficiently deep to resist all vertical strains. It will be understood that there is a frame E on each side of the machine, each one being connected, in the manner before specified, with a vertical bar $B^4$ of the front frame. Each frame E is formed near its upper front end with an upwardly projecting arm E' to which is rigidly secured a laterally projecting stud axle $g$ on which are mounted two sprocket wheels G that revolve on the stud axle but are held in place by suitable collars. At the upper and lower ends of the rear part of each frame E there are stud axles $g'$, each of which supports two sprocket-wheels G' and just below the sprocket-wheels G of each frame, the frame carries a sleeve $g^2$ through which extends a shaft $g^3$ carrying two sprocket-wheels $G^2$. Each frame E supports a cam track F, the latter being held suitably around the frame by brackets $e$ projecting from the shafts $g$, $g'$, of the sprocket-wheels G, G' and from the shafts $g^3$ by hangers $e'$. Sprocket chains H encircle the sprocket-wheels G, G', $G^2$, in the manner clearly shown. The shaft $g^3$ on each side of the machine carries a sprocket wheel I which, when rotated, imparts motion to the two chains H of each set of chains.

Motion is imparted from the wheels A to the sprocket-wheels I in the following manner:—Each wheel A carries a pawl I' engaging a ratchet-wheel $I^2$ on the stud axle $a$ and rigidly secured to a spur wheel $I^3$ connected by a chain $I^4$ with a sprocket-wheel $I^5$ on a shaft $I^6$ mounted in a bearing bracket $I^7$ projecting from one of the frame bars $B^6$. The two shafts $I^6$ are connected by a sleeve $I^8$ which is adjustable on the shafts so that the connection may be extended or shortened to provide for the widening or narrowing of the machine. On the sleeve $I^8$ are sprocket wheels $I^9$ which are connected by chains $I^{10}$ with the sprocket-wheels I on the shafts $g^3$. The driving mechanism on opposite sides of the machine is of the same construction and in this way motion may be communicated from each wheel A to picker-mechanism on the same side of the machine. The sprocket-wheels $I^9$ are adjustable on the sleeve $I^8$ so that when the machine is widened or narrowed the sprocket-wheels may be properly set for this adjustment of the machine.

Each casting D carries a bracket $D^2$ to which is attached a rack bar J having teeth on its upper side and extending rearwardly and downwardly below the plane of the cam tracks above referred to. The cam tracks are supported on the frame E between the chains H of each pair. Each cam track is continuous and comprises a lower portion $f$ extending parallel with the line of draft, an upper portion $f'$ also extending parallel with the line of draft but in a plane nearer to the middle of the machine than the portion $f$, a rear portion $f^2$ connecting the upper and lower portions $f$ and $f'$ and a front portion $f^3$ connecting the upper and lower portions. The two sprocket chains H of each pair are parallel with each other and are so held by their pulleys G as to run, as viewed from the side, in lines substantially following the contour of the cam track arranged between them. These chains carry the pickers across the top of the rack bars J downwardly and rearwardly, then carry them upwardly and inwardly over the top of the frame E, then downwardly and outwardly at the front of the frame onto the rack bars and so on.

The picker-stems are preferably arranged in groups, as illustrated, three picker-stems being preferably employed in each group. The middle picker-stem L is connected with a short shaft $l$ carrying a bevel wheel $l'$ meshing with a bevel wheel $l^2$ by means of which the middle picker is positively rotated about its longitudinal axis. The shaft $l$ extends through a bearing in a bracket $l^3$ which bracket is formed with laterally projecting arms $l^4$ through which extend the shanks $l^5$ of the two outer picker-stems L'. Each of the shanks $l^5$ carries a spur wheel $l^6$ gearing with a spur wheel $l^7$ carried by the shaft $l$ of the middle picker-stem L. The revolving central picker-stem L in this way communicates motion to the outer picker-stem L'. These, however, turn in an opposite direction, in the manner indicated in Fig. 6. Each picker-stem preferably consists of a thin concaved relatively narrow long blade $m$ of sheet metal twisted, as indicated, after the manner of a twist drill, and tapered toward its lower end which is much narrower than its upper end. The edges of the blade are serrated with teeth resembling saw-teeth. Such a picker is illustrated in Fig. 8 and the form of picker shown in Fig. 8 may be employed, but I may also add to the blade $m$ other blades $m'$. These may be riveted to the blade $m$ and twisted in the manner indicated, their outer edges being serrated in the manner before described. These picker-stems are designed to enter into the ripe bolls of cotton, bore into them, wind the cotton around them, then recede and detach the cotton from the bolls and carry it away to a suitable receptacle in the manner hereinafter described.

Each of the brackets $l^3$ depends from a laterally sliding bar M which is arranged to move back and forth in a supporting bar M' carried by a pair of chains H. Each bar M' is firmly connected with a pair of chains on one side of the machine in any suitable way and is carried around the frame E by the chains. It has a dove-tail connection with the sliding bar M permitting of the lateral movement of the bar M, but preventing it from moving in any other direction. Each bar M' is slotted and through this slot extends a pin $n$ carried by the companion sliding bar M. The pin $n$ enters the groove in the cam track F and as the bars M' are carried around by the chains H, the pins $n$, by traveling in the cam tracks, are shifted laterally at the proper time and therefore cause the bars M to be moved back and forth laterally, thus causing the groups of pickers to be laterally shifted. Each pinion $l^2$ is attached to a shaft N supported in brackets on a sliding bar M, and each carrying a spur-wheel $n'$ adapted to gear with the rack bar J. This rack bar, it will be observed, only engages the pinions $n'$ when said pinions are traveling from the front portion of the picking mechanism downward toward the rear portion. As soon as the pinions pass off from the low or rear portions of the rack bars, the pickers are raised from the rack bars and move laterally inward toward the central portion of the machine, but on the return movement the pinions $n'$ are brought into line with the rack bars and gear therewith when they are traveling rearward and downward below the cam tracks. It will thus be seen that each group of pickers is projected laterally outward as its moves downward and that as it moves rearward each picker in the group is rotated about its own axis. The length of the bars M vary and the pins $n$ are properly located to cause the groups of pickers to travel in different longitudinal lines, or those lines which run parallel with the line of draft. This is for the purpose of causing the pickers to operate on at least one-half of each row of bushes. Each group of pickers is so held by its supporting bracket that when it is moving downward and rearward over the rack bar, the picker-stems are held in substantially vertical plane. This manner of holding the pickers is such that on the upward and downward movement the picker-stems are presented to the stripping mechanism at such an angle as to be most efficiently operated upon.

In the drawings I have shown nine groups of pickers on each side of the machine and as illustrated they are some distance apart, but a larger number of groups may be employed and they may be arranged much closer together.

The gearing for operating the chains H is such that the chains travel rearward at about the same speed that the machine travels forward so that when a group of pickers enters a plant there is no dragging action of the pickers in the plant. Each group of pickers when it arrives at the front of the frame E, is turned downwardly, as indicated in Fig. 1, and extends vertically into a plant and engages the cotton in the bolls. It remains in engagement therewith long enough to gather the cotton and then as each group of pickers comes to the lower end of the rack bar J, it is withdrawn from the plant and carried upwardly and then forwardly, as shown in Fig. 1. Preferably each group of pickers is made to extend diagonally downward and outward, although each group might be made to extend in a straight line downward from its support. Each group of pickers as it is carried over the top of the picker-frame is turned slightly downward, as indicated in Fig. 1, and the cotton is removed from the picker-stems by means of a rotary drum O armed with wire teeth $o$. Such rotary brushes are common in this art and those shown need not be described in detail. There are two such brushes employed, one on each side of the machine, as indicated in Figs. 3 and 4. Each brush is connected by a spur-wheel $o'$ to a spur-wheel $o^2$ on the shaft $I^6$, and the cotton gathered by the brushes is stripped therefrom by combs P attached to the frame bars R supported on the diagonal frame bars $B^6$, which bars R also support the shafts of the brushes.

Any suitable receptacles may be employed for receiving the detached cotton, as shown, boxes S are employed for this purpose which are suspended from the frame bars R.

In order to stiffen the structure the front ends of the frame bars R are preferably connected by the adjustable cross bars T.

It will be seen that the mechanisms on opposite sides of the central longitudinal line of the machine are substantially duplicates of each other and provision is made by which these two sets of mechanisms may be brought nearer together or moved farther apart without interfering with their operation. Thus the farmer, before he starts to work in the field, may adjust the machine to operate properly on the rows of bushes whatever be the distance apart of the rows, and it will be observed, that the picking mechanism on each side of the machine can be adjusted bodily up and down so that the pickers may operate on the ripened bolls on the lower parts of the bushes or on the ripened bolls on the upper part thereof, according to the condition of the bolls in the particular season when the machine is used. This facility of adjustment both vertically and laterally is considered a very important feature of this machine. The form of picker-stems shown is considered simple and efficient, but other forms can no doubt be used with facility, but the particular shape given to the picker-stems is such that the cotton can be very efficiently gathered therefrom.

The picker-stems are engaged by the brushes in the manner indicated in Fig. 6 and as the teeth of the brushes wipe down upon the stems, the latter will be caused to rotate, thus presenting all sides to the action of the brushes and enabling the cotton to be completely gathered therefrom.

I claim as my invention:—

1. A cotton harvesting machine, comprising picking mechanism on each side of the central line of draft, a main frame made in two parts, each supporting picking mechanism and each provided with a carrying wheel, means for adjusting the width of the main frame to vary the distance between the picking mechanisms, and means for adjusting the frame to vary the distance between the wheels without changing the distance between the picking mechanisms.

2. A cotton harvesting machine, comprising two sets of picking mechanisms, one set on each side of the central line of draft, a main frame made in two parts, each supporting picking mechanism and each provided with a carrying wheel, means for adjusting the width of the machine frame to vary the distance between the picking mechanisms, means for adjusting each set of picking mechanism vertically, and means for adjusting the main frame to vary the distance between the carrying wheels without changing the distance between the picking mechanisms.

3. A cotton harvesting machine adapted to operate between two adjacent rows of cotton plants, comprising two duplicate sets of picking mechanisms adapted to operate simultaneously on two rows of plants, carrying wheels adapted to travel outside said two rows of plants, a frame supported on said carrying wheels and upon which the picking mechanism is supported, means for adjusting said frame to lengthen or shorten the distance between the wheels and to move the two sets of picking mechanisms toward and from each other to operate upon two rows of plants closer to or farther away from each other, and means for adjusting the distance between the carrying wheels without changing the distance between the picking mechanisms.

4. A cotton harvesting machine, comprising two sets of picking mechanisms adapted to operate upon two adjacent rows of plants simultaneously, frames on which said picking mechanisms are mounted, a main frame to which the picker-carrying frames are attached, means for adjusting the width of the main frame, arched frame parts contained in said main frame and adapted to extend over the tops of the two adjacent rows of plants, means for adjusting the widths of these arched parts, and carrying-wheels supported by said arched parts of the frame.

5. A cotton harvesting machine adapted to operate between two adjacent rows of plants, comprising a main frame having arched bars on opposite sides of the machine, said bars consisting of lower outer portions to which the carrying wheels are connected, upper horizontal adjustable parts and lower inner parts, adjustable bars for connecting the lower inner parts, vertical frames attached to said first-mentioned frame bars, and frames carrying the picking mechanism carried by said vertical frames and vertically adjustable thereon.

6. In a cotton harvesting machine, the combination of the front main wheel supported frame and the rear picker-supporting frames connected with the front frame and adjustable vertically thereon and an adjustable connection between the two picker-supporting frames by means of which said frames may be moved toward and from each other horizontally and means for adjusting the width of the main frame.

7. In a cotton harvesting machine, the combination of a series of groups of pickers arranged to move in different planes, means for moving each picker about its own axis, means for simultaneously moving all the pickers in each group downward and outward while the pickers are rotating, thus projecting them laterally toward the adjacent row of plants, for holding them against forward and backward movement relatively to the plants while engaged therewith, and for then withdrawing them upward and inward from the plants.

8. In a cotton harvesting machine, the combination of a picker-supporting frame, an endless chain, a picker supported by the chain and projecting downwardly and outwardly sidewise relatively to the line of draft while picking, means for rotating the picker about its own axis while in the act of picking, and means for stripping the gathered cotton from the picker.

9. In a cotton harvesting machine the combination of a picker supporting frame, an endless chain carried thereby, a series of groups of pickers carried by the chain wherein the pickers in each group project downwardly and outwardly sidewise relatively to the line of draft, means for moving the groups of pickers laterally toward and from the rows of plants on which they operate and means for moving the groups of pickers downwardly and rearwardly and then upwardly and forward.

In testimony whereof, I have hereunto subscribed my name.

HENRY B. MORRIS.

Witnesses:
R. S. GRAHAM,
T. E. WHEELER.